United States Patent Office 2,917,689
Patented Dec. 15, 1959

2,917,689

ELECTRICAL CONTROL APPARATUS FOR ROLLING MILL

Donald E. Abell, Buffalo, N.Y., assignor to Westinghouse Electric Corporation, East Pittsburgh, Pa., a corporation of Pennsylvania Application March 28, 1957, Serial No. 649,030

3 Claims. (Cl. 318—6)

The present invention relates in general to electrical control apparatus, and more particularly, to electrical control apparatus for controlling the operation of metal rolling mills by controlling the operation of a variable load device such as a rotating winding reel member for a strip rolling mill, where the winding reel is operative with the metal strip for controlling the tension of the strip.

The electrical control apparatus in accordance with the present invention is related to the control apparatus shown and described in copending patent application Serial No. 557,748, filed on January 6, 1956, by the same inventor and assigned to the same assignee as the present invention.

It is an object of the present invention to provide an improved electrical control apparatus for a variable load device, which apparatus is operative to compensate or provide a desired correction for a predetermined operational condition of said load device.

It is another object of the present invention to provide an improved electrical control apparatus for the drive motor of a rotatable member operative as a variable load member.

It is a further object of the present invention to provide an improved electrical control apparatus for a variable load device such as a strip tension controlling winding reel for a metal rolling mill and driven by an electric motor.

It is a different object of the present invention to provide an improved electrical control apparatus for a motor driven strip tensioning device for a strip rolling mill, and which apparatus is operative to compensate for operational conditions of said device such as extreme or unusual tension ranges and/or windage and friction losses of the strip rolling mill.

It is an additional object of the present invention to provide an improved electrical control apparatus for a strip tensioning device of a strip rolling mill wherein a predetermined approximate correction is provided and which correction may be readily changed or adjusted as desired to meet changing operational conditions of the strip rolling mill.

It is still another object of the present invention to provide an improved electrical control apparatus for a variable load device, which apparatus may be readily adjusted to meet changing load conditions by changing any one or more than one of a plurality of provided adjustments to result in a very flexible control of said load device.

These and other objects and advantages of the present invention will become apparent in view of the following description taken in conjunction with the drawings, wherein.

Figure 1:
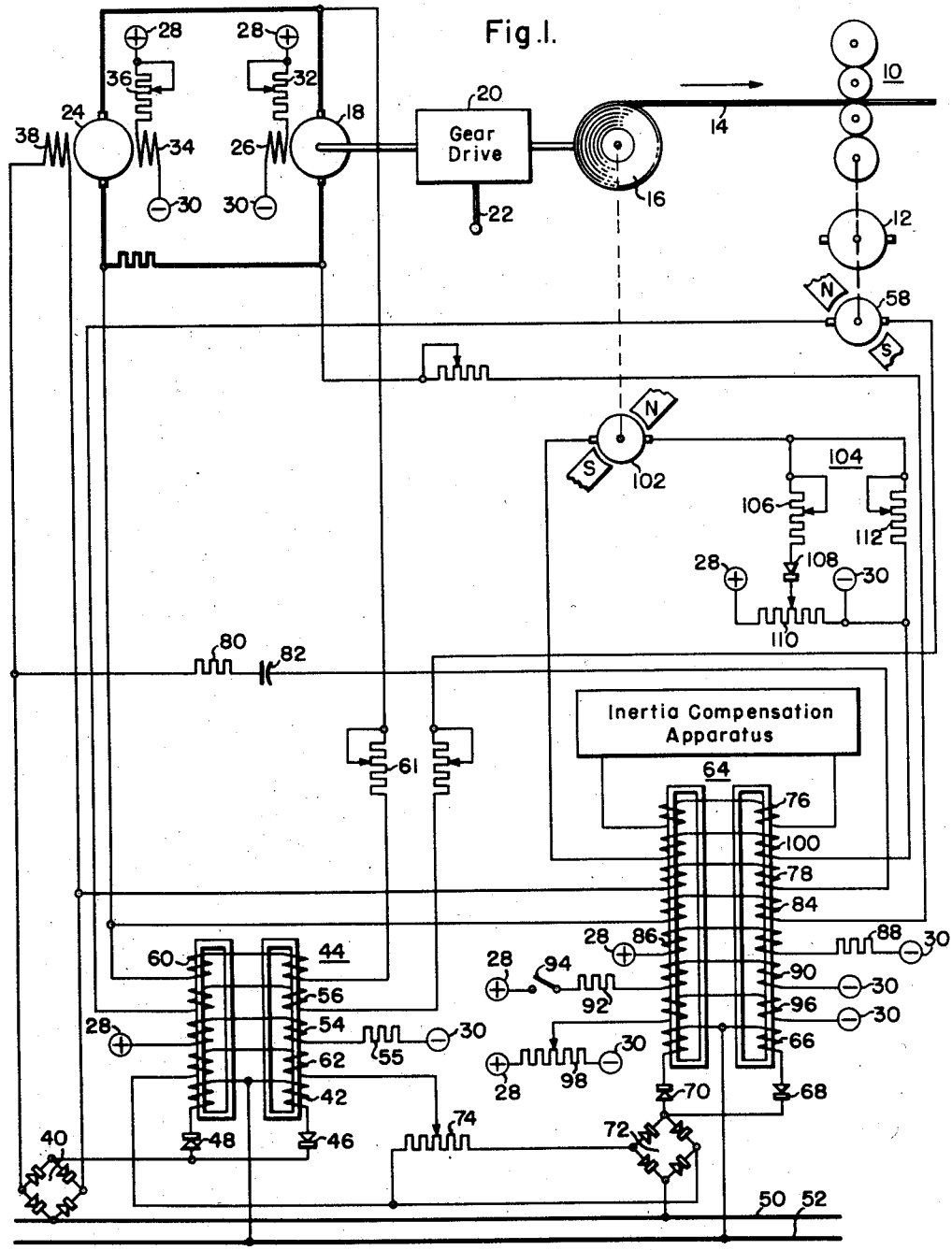
Figure 1 is a schematic showing of electrical control apparatus in accordance with the present invention.

In Fig. 1, there is shown a rolling mill 10 driven by a mill motor 12. A metal strip 14 is operative with the mill 10, and is operative with a winding reel 16 driven by a motor 18 through a gear drive 20. A control lever 22 is provided for the gear drive and is operative for selecting the gear ratio thereof. The motor 18 is electrically connected in the armature circuit of a generator 24 such that the generator 24 may supply energy for driving and controlling the motor 18. However, the normal use may be such that the motor 18 is driven by the winding reel 16 and thereby supplies energy to the generator 24. The field winding 26 for the motor 18 is connected between a pair of supply conductors 28 and 30 having respectively positive and negative polarities as indicated in Fig. 1. A control impedance member 32 is provided in series with the field winding 26.

A reverse field winding 34 is provided for the generator 24 and is connected between the same common electrical energy supply conductors 28 and 30 through a control resistor 36. A control field winding 38 is provided for the generator 24 and is connected through a rectifier bridge circuit 40 and the output winding 42 of a magnetic amplifier device 44 through the rectifier devices 46 and 48 as shown, and across a source of alternating current energy illustrated by the conductors 50 and 52.

A bias winding 54 is provided for the magnetic amplifier 44 and is connected between the common supply conductors 28 and 30 through a control resistor or impedance member 55. A mill motor speed sensitive winding 56 is connected to the output of a pilot generator 58 operative with the rolling mill 10 for sensing the operative speed of the rolling mill 10. A generator voltage sensitive winding 60 is connected through a control resistor member 61 to be sensitive to the output voltage of the generator 24. A control winding 62 is connected to the output of the voltage regulating magnetic amplifier 64 through the output winding 66 of the latter magnetic amplifier 64 and through the rectifier devices 68 and 70 and a rectifier bridge 72, with a voltage adjusting resistor 74 being connected in parallel with the control winding 62 for determining the value of the control signal supplied to the control winding 62 of the magnetic amplifier 44.

There is provided for the magnetic amplifier 64 an inertia compensation winding 76 in accordance with the teachings of the above-referred-to copending application Serial No. 557,748, filed January 6, 1956, by myself. An anti-hunt winding 78 is provided and is connected across the control field 38 of the generator 24, through the resistor 80 and capacitor 82 circuit for providing stability to the operation of the magnetic amplifier 64 and responding to the rate of change of the generator field current. A control winding 84 is provided for the magnetic amplifier 64, which control winding 84 is responsive to the armature current of the motor 18 and therefore, to the load on motor 18. A bias winding 86 is provided and is connected between the common reference potential supply conductors 28 and 30 through a control resistor 88. An emergency stop winding 90 is provided, and is connected between the common reference potential supply conductors 28 and 30 through a control resistor 92 and a manual switch member 94 to provide a manual stop control for the operation of the rolling mill 10 and winding reel 16. A pattern winding 96 is provided and is connected between the common reference potential supply conductors 28 and 30 through the potentiometer 98 as shown, to provide a point of operation for the magnetic amplifier 64. A second control winding 100 is provided in accordance with the teachings of the present invention and is responsive to the output of the pilot generator 102 operatively connected to the winding reel motor 18 to be responsive to the operating speed of the winding reel motor 18 for providing an output voltage or control signal which varies as a function of or proportional to the operating speed of the winding reel 16.

A control circuit 104 is provided, including a first impedance or resistance member 106 connected in series with a rectifier or unidirectionally conductive device 108 and an adjustable source of reference voltage from across an adjustable portion of a reference voltage dropping resistor 110 connected between the common reference voltage supply conductors 28 and 30, as shown in Fig. 1. A second control impedance or resistance member 112 is connected in parallel with the combination of the first impedance member 106, the rectifier 108 and the portion of the dropping resistor 110, as shown in Fig. 1. The control circuit 104 is connected in series between the pilot generator 102 and the second control winding 100 of the magnetic amplifier 64.

Figure 2:
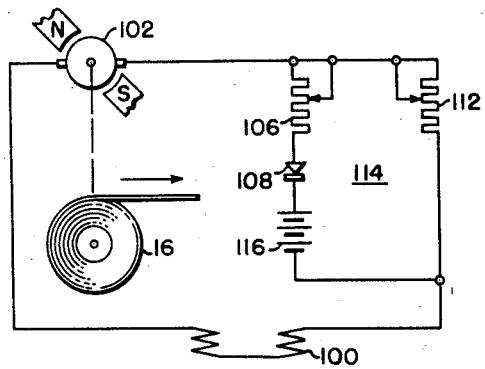
Fig. 2 is a schematic showing of a modification of a portion of the control apparatus in accordance with the present invention.

In Fig. 2, there is shown a modification of the control apparatus in accordance with the present invention, wherein a control circuit 114 is shown connected in series between the pilot generator 102 and the second control winding 100 of the magnetic amplifier 64 shown in Fig. 1. The control circuit 114 includes a similar first impedance member 106, second impedance member 112 and rectifier device 108. However, a source of direct current reference voltage in the form of a battery 116 is shown in series with the first impedance member 106 and the rectifier 108. An adjustable resistor member may be connected in series with the battery 116, if desired, to provide an adjustment for said reference voltage.

Figure 3:
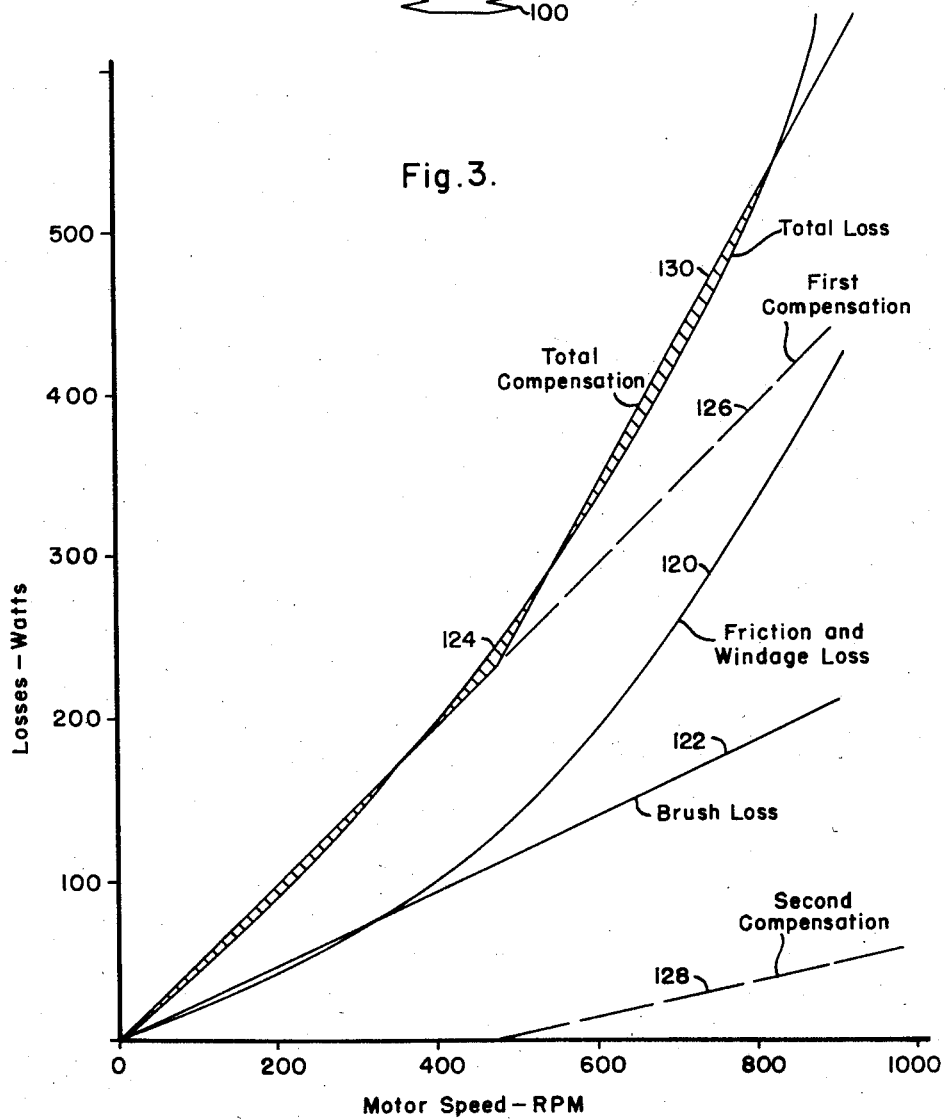
Fig. 3 is a curve chart illustrating the operation of the control apparatus in accordance with the present invention.

In Fig. 3, there is shown a curve chart illustrating the operation of the control apparatus in accordance with the present invention. In Fig. 3, there is shown a first curve 120 illustrating the total estimated friction and windage losses for a particular rolling mill 10, winding reel 16 and drive assembly including motor 18 and the generator 24 as shown in Fig. 1. The curve 122 is representative of the brush loss involved with the apparatus shown in Fig. 1. The curve 124 is representative of the total loss including the friction and windage losses as represented by the curve 120 and the brush losses as represented by the curve 122. It is noted that this latter curve approximates an exponential power such as a cubic curve. A first compensation is provided by the second impedance or resistor member 112 shown in Fig. 1 and corresponding to the curve 126. A second compensation is provided by the first impedance member 106 and in accordance with the curve 128 shown in Fig. 3. The starting point of the latter curve 128 is determined by the adjustment of the tap on the potentiometer 110 shown in Fig. 1, or the value of the reference voltage supplied by the battery 116, as shown in Fig. 2. The total compensation as illustrated by the curve 130, is provided by adding the second compensation curve 128 to the first compensation curve 126. The shaded area shown in Fig. 3 between the curves 124 and the two-step curve 130 is representative of the error between the compensation provided by the control circuit 104 and the total actual losses.

In this regard, most prior art control apparatus for the winding reels of a strip mill regulate the strip tension by regulating the current in the motor armature circuit and by keeping the motor field flux proportional to the diameter of the coil on the winding reel. When the strip tension range becomes extreme or unusual or when the mechanical losses represented by windage and friction of the whole apparatus of the strip mill become a significant part of the motor output, the strip tension varies considerably, even though the motor armature current may be held constant. This is particularly true in the case of aluminum foil mills where the strip tension is light and where the motor and gearing losses become rather high.

In accordance with the teachings of the present invention, a control signal is supplied to the current regulating magnetic amplifier 64 which represents the windage and friction losses of the rolling mill and associated apparatus which current can be varied such that the strip tension can be held substantially constant. The windage and friction losses are some function of winding reel speed and since each winding reel drive has different gears, motors, etc., the windage and friction loss curves vary quite a bit from mill to mill and must be determined by empirical tests of any particular installation. However, it has been determined that most windage and friction loss curves are roughly in a third power relationship or a cubic with respect to the winding reel speed.

The method of compensation for windage and friction losses in accordance with the teachings of the present invention, in effect approximates a cubic or third power curve of the winding reel speed, but the present control apparatus is flexible enough such that adjustments can be made to approximate any desired control curve, for example a curve of some other exponential power.

The pilot generator 102 is driven by the winding reel 16 such that the output voltage or control signal from the pilot generator 102 is a predetermined function of or proportional to the speed of the winding reel 16. This latter output voltage or control signal is first applied to the second control winding 100 of the magnetic amplifier current regulator 64 through the second control impedance or resistor 112 of the control circuit 104 shown in Fig. 1. This provides a linear compensation relative to the speed of the winding reel 16 and in accordance with curve 126 of Fig. 3. As the output voltage of the pilot generator 102 increases, as a function of the speed of the winding reel, this output voltage approaches the value of the reference voltage as determined by the position of the tap on the potentiometer or voltage dropping resistor 110. In practice, this reference voltage may be obtained by a small transformer and three-phase rectifier bridge, if desired. As the output voltage of the pilot generator 102 exceeds the value of the reference voltage provided by the portion of the voltage dropping resistor 110 connected in series with the first control impedance or resistance member 106, a second current component flows through the first control impedance member 106 to the second control winding 100 of the magnetic amplifier 64. This causes a change in the provided compensation as illustrated by the break in the total compensation curve 130 shown in Fig. 3, such that the compensation curve 130 is no longer a straight line but comprises instead two straight lines. In this respect and referring to the curve chart shown in Fig. 3, two straight lines comprising the total compensation curve 130 are used to approximate the total actual loss curve 124, with the shaded area between these two curves representing the error in the actual compensation.

In this regard, a plurality of such breaks in the compensation curve 130 may be provided if desired with the first compensation being provided by the second impedance member 112, and the bias voltage provided by the voltage dropping resistor 110 determining the break point and the first impedance member 106 adjusting the second straight line slope. In addition, third, fourth and more or less as desired, control impedance members may be connected in parallel with the second control impedance member 112 and including respectively, series connected and opposing rectifier devices and bias or reference voltage sources to determine the points of the additional breaks in the total compensation curve and for determining the number of steps or straight lines in the total compensation curve 130.

In this regard, it has been found to be suitable for most windage and friction losses involving strip rolling mill apparatus, that two segments or steps to the total compensation curve 130, as shown in Fig. 3, are believed adequate.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention. Further, it should be noted that the descriptive operation of the magnetic amplifiers 44 and 64 relative to the arrangement of the various windings and other apparatus not described in detail in the present specification may be found in the above-mentioned copending application.

I claim as my invention:

1. In electrical apparatus for controlling the supply of energy to a rotating strip reel load device, said apparatus being operative with a source of electric power, the combination of a motor operatively connected to said load device for controlling the rotation of said load device, a power regulator operatively connected between said power source and said motor for controlling the operation of said motor, an electric signal providing device operatively connected to said load device for providing an output control signal which varies as a function of the rotating speed of said load device, and a control circuit connected between said signal providing device and said power regulator for controlling the operation of said power regulator and thereby controlling the operation of said motor, with said control circuit having a first circuit branch including an impedance device and a predetermined reference voltage source connected in series and a second circuit branch including a second impedance device and being connected in parallel with said first circuit branch, said control circuit being operative to control the operation of said motor as a function of the value of said first and second impedance devices and the value of said predetermined reference voltage.

2. In electrical apparatus for controlling the supply of energy to a rotating strip reel load device, said apparatus being operative with a source of electric power, the combination of a motor operatively connected to said load device for controlling the rotation of said load device, a power regulator operatively connected between said power source and said motor for controlling the operation of said motor, an electric signal providing device operatively connected to said load device for providing an output control signal which varies as a function of the rotating speed of said load device, and a control circuit connected between said signal providing device and said power regulator for controlling the operation of said power regulator and thereby controlling the operation of said motor, with said control circuit having a first circuit branch including an impedance device and a predetermined reference voltage source connected in series and a second circuit branch including a second impedance device and being connected in parallel with said first circuit branch, said control circuit being operative to control the operation of said motor as a function of the value of said first and second impedance devices and the value of said predetermined reference voltage, with said first impedance device being responsive to said output control signal such that a voltage drop occurs across said first impedance device which varies as a function of said output control signal and which opposes said predetermined reference voltage, and with a unidirectionally conductive device being connected between said first impedance device and said predetermined reference voltage source such that the conductivity direction of said unidirectionally conductive device is directed to oppose said predetermined reference voltage source.

3. In control apparatus for regulating the strip tension of a metal rolling mill including a rotating strip winding reel member, said apparatus being operative with a source of voltage, the combination of a motor for controlling the rotation of said rotating reel member, a motor control device operatively connected between said voltage source and said motor for controlling the operation of said motor, a control signal providing device operative with said rotating reel member for providing a control signal which varies as a function of the rotational speed of said rotating reel member, and a control circuit including a first control element operative with said control signal for providing a first control voltage and a second control element for providing a predetermined reference second control voltage, with said first and second control elements being connected in series and such that said first control voltage is in opposition to said second control voltage, and with said control circuit being connected to said motor control device for providing a predetermined operation of said motor as controlled by said first and second control voltages, with said control circuit including a first circuit branch comprising said first control element and said second control element, and with said control circuit including a second circuit branch connected in parallel with said first circuit branch, said second circuit branch comprising a third control element operative with said control signal for providing a third control voltage, with said third control element having a predetermined value to control the operation of said motor to provide a first predetermined operation of said rotating member for one range of operation of said rotating member, and with said first and second control elements being operative such that said first control voltage opposes said second control voltage and becomes greater than said second control voltage to provide a second predetermined operation of said rotating member for another range of operation of said rotating member.

References Cited in the file of this patent

UNITED STATES PATENTS

| | | |
|---|---|---|
| 2,437,973 | Schmitz | Mar. 16, 1948 |
| 2,583,078 | Auburn et al. | Jan. 22, 1952 |
| 2,697,201 | Harder | Dec. 14, 1954 |